(12) United States Patent
Lee et al.

(10) Patent No.: US 8,775,159 B2
(45) Date of Patent: Jul. 8, 2014

(54) TYPEWRITER SYSTEM AND TEXT INPUT METHOD USING MEDIATED INTERFACE DEVICE

(75) Inventors: Dae Ha Lee, Daejeon (KR); Jae Hong Kim, Daejeon (KR); Min Su Jang, Daejeon (KR); Chan Kyu Park, Daejeon (KR); Hyeon Sung Cho, Daejeon (KR); Sang Seung Kang, Daejeon (KR); Cheon Shu Park, Daejeon (KR); Joo Chan Sohn, Daejeon (KR); Jae Yeon Lee, Daejeon (KR); Yun Koo Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 705 days.

(21) Appl. No.: 12/965,249

(22) Filed: Dec. 10, 2010

(65) Prior Publication Data

US 2011/0144975 A1    Jun. 16, 2011

(30) Foreign Application Priority Data

Dec. 10, 2009   (KR) .................. 10-2009-0122729

(51) Int. Cl.
*G06F 17/27* (2006.01)

(52) U.S. Cl.
USPC .................. 704/9; 704/7; 704/8; 704/10

(58) Field of Classification Search
USPC ....................................... 704/7–10
See application file for complete search history.

(56) References Cited

U.S. PATENT DOCUMENTS

2003/0220788 A1* 11/2003 Ky ............................. 704/235
2005/0234722 A1* 10/2005 Robinson et al. ........... 704/257

FOREIGN PATENT DOCUMENTS

| JP | 10-208023 | 8/1998 |
| JP | 11-15920 | 1/1999 |
| KR | 1020030049256 | 6/2003 |
| KR | 10-0549994 | 2/2006 |

* cited by examiner

*Primary Examiner* — Leonard Saint Cyr
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed is a typewriter system and a text input method capable of accurately recognizing words by correcting words input using a mediated interface device based on a dictionary. A plurality of texts are combined by referencing a text recognition order set in which recognition results of texts are arranged according to a recognition order from texts input through the mediated interface device and the combined text is filtered using part index maps formed of part words that are an accumulated set of texts forming complete words. The part words passing through the part index maps is again filtered using a dictionary including context information formed of a set of words in a specific category, thereby making it possible to accurately recognize the words. The part words that cannot form words in a dictionary are removed in advance using the part index maps, thereby improving the recognition efficiency.

8 Claims, 3 Drawing Sheets

TYPEWRITER SYSTEM AND TEXT INPUT METHOD USING MEDIATED INTERFACE DEVICE

CROSS-REFERENCE TO RELATED APPLICATIONS

This application claims priority under 35 U.S.C. §119 to Korean Patent Application No. 10-2009-0122729, filed on Dec. 10, 2009, in the Korean Intellectual Property Office, the disclosure of which is incorporated herein by reference in its entirety.

TECHNICAL FIELD

The present disclosure relates to a typewriter system and a text input method, and more particularly, to a typewriter system and a text input method capable of searching intended words by correcting input texts using a mediated interface device.

BACKGROUND

Examples of a gesture input device include a glove or a bar device with an accelerator sensor or an infrared sensor, etc. Gestures or texts may be expressed using the above devices, and a robot or other systems can be controlled by the gesture input devices. Those input devices are called mediated interface devices since they transfer information between a person and a machine.

When any command is issued to the robot through the mediated interface device, the gesture expression is basically used. There may be the direction instruction, the emotion expression, or the text expression in the gesture. The motion of the robot may be controlled by the direction instruction, the current state of the user may be transmitted to the robot by the emotion expression, and the detailed command may be transmitted to the robot by the text expression. The gesture expressions may be appreciated by a gesture recognition technology, a text recognition technology, etc.

When the continuous text expression, that is, the word information is transmitted to the robot through the mediated interface, more semantic information can be transmitted to the robot than just transmitting a command of a single character. Then, the interaction between a person and a robot can be richer. However, different words from the intended ones may be input due to the errors of the sensors of the mediated interface device or the text recognition system. It would be preferable if the intended word can be recognized despite of the internal error of the mediated interface device or the system, which enables better interaction between the person and the robot.

SUMMARY

The present invention proposes to solve the above problem. It is an object of the present invention to improve recognition performance by searching intended words by correcting erroneous texts when intending to input texts using a mediated interface device and recognize words using the same.

In other words, the present invention accurately recognizes the texts input by the mediated interface device according to user's intention, thereby making it possible to realize smooth interaction between a person and a robot.

In order to achieve the above-mentioned objects, according to an aspect of the present invention, there is provided a typewriter system, including: an intermediated interface device; a text recognition order set that arranges recognition results of texts input through the mediated interface device according to a recognition order; and a typewriter that combines the text input through the mediated interface device by referencing the text recognition order set and corrects the combined texts using a dictionary.

The typewriter may includes a word maker that combines the texts input through the mediated interface device and a part index map formed of part words that are an accumulated set of texts forming complete words. Preferably, the part index map includes a Korean part index map and an English part index map.

The typewriter may further include a context information storage unit that is formed of a set of words in a specific category. The intermediated interface device, the text recognition order set, and the typewriter are formed in one body or the text recognition order set and the typewriter are configured as a separate device from the mediated interface device, such that it may communicate with the mediated interface device in a wireless communication manner.

According to an another aspect of the present invention, there is provided a text input method using a mediated interface device, including: receiving texts through the mediated interface device; combining one or more words corresponding to the input texts, based on a text recognition order set that arranges recognition results of texts input through the mediated interface device according to a recognition order; and selecting one of one or more combined words based on a dictionary.

The selecting includes selecting one or more word included in a part index map, the part index map being formed of part words that are an accumulated set of texts forming complete words, by comparing the combined words with the part index map.

According to an exemplary embodiment of the present invention, it can correct the wrongly recognized words due to the erroneous texts when recognizing words using the mediated interface device, thereby making it possible to accurately recognize texts according to the user's intention and achieve intuitive and smooth communication between the person and the machine using the mediated interface device.

Other features and aspects will be apparent from the following detailed description, the drawings, and the claims.

DETAILED DESCRIPTION OF EMBODIMENTS

Figure 1:
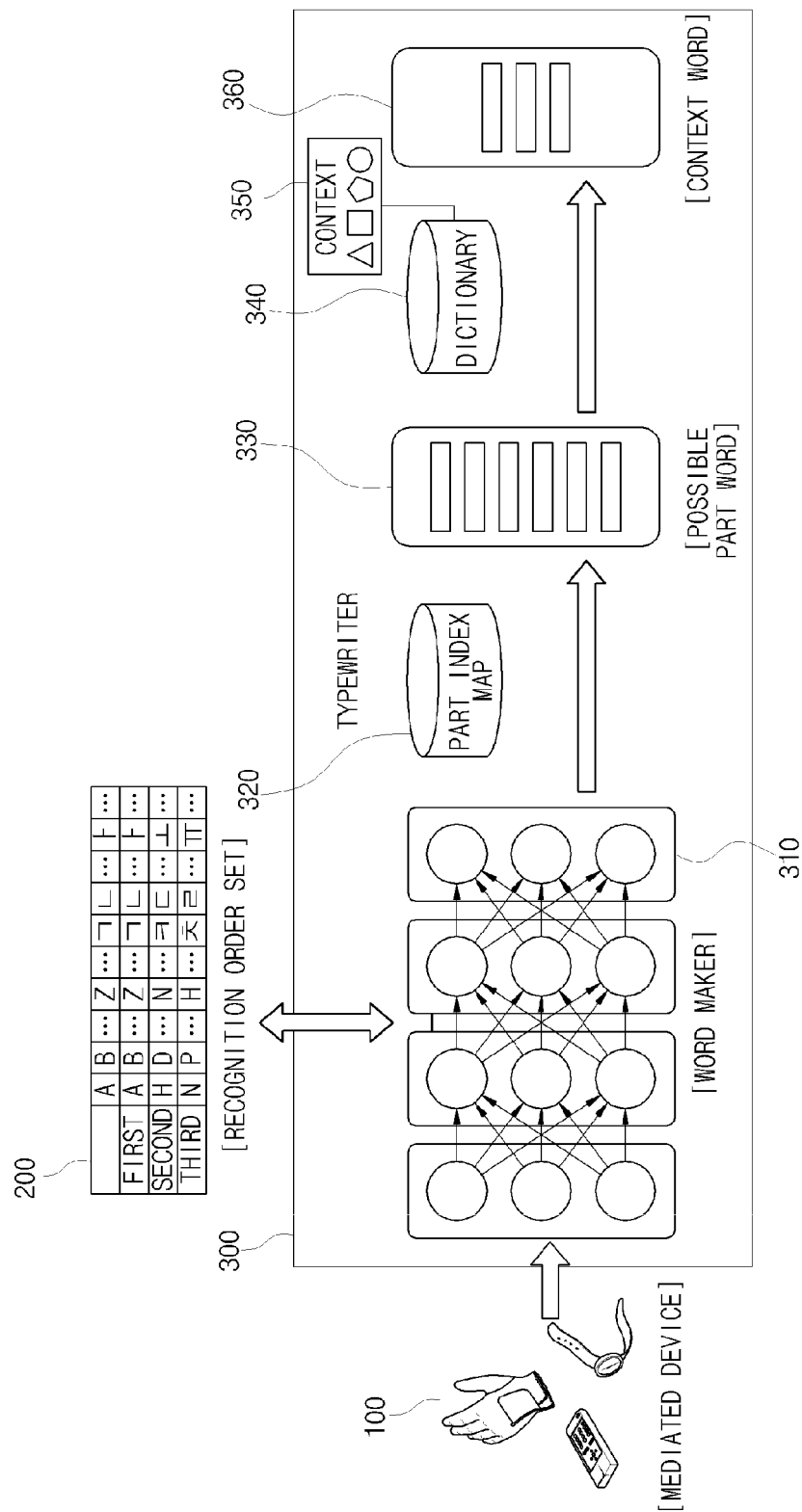
FIG. 1 is a diagram showing an overall configuration of a typewriter system according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is an overall configuration of a typewriter system according to an exemplary embodiment of the present invention.

The typewriter system according to an exemplary embodiment of the present invention includes a mediated interface device 100 that is an input unit, a text recognition order set 200, and a typewriter 300 that recognizes and corrects words.

The mediated interface device 100, the text recognition order set 200, and the typewriter 300 may be configured in one body or may be configured in two or more devices and can transmit and receive necessary information among them using a wireless communication scheme.

The mediated interface device 100 is a device that enables a user to input words through gestures and may be a glove or, a bar device, in which an accelerator sensor or an infrared sensor are mounted. When words are input through the mediated interface device 100, the mediated interface device 100 generates the text set for words by referencing the recognition order set 200 of each text and then transmits the generated text set to the typewriter 300.

The recognition order set 200 of each text is not readymade, but is formed dynamically by configuring the recognition results for the texts input from the mediated interface device 100 according to the recognition order. For example, when alphabet 'A' is input through the mediated interface device 100, if alphabet 'A' is recognized as 'A' to 85%, as 'H' to 50%, and as 'N' to 30% through the text recognition, the input text is recognized as 'A', which has the highest recognition rate. At this time, 'A', 'H', and 'N' are called the text recognition order set.

There is a possibility that the intended text is erroneously recognized and thus, the intended words cannot be transmitted due to an internal error of the mediated interface device and/or the error of text recognition. In order to solve the problem, the recognition order set of each text input from a word maker 310 is combined and the intended word is searched through a dictionary. It depends on the assumption that the texts to be input should be in the recognition order set of the texts even though each text is wrongly recognized.

However, when the word maker 310 make up the words of every possible case, the number of generated words gets higher and thus, memory consumption and a time delay occur. In order to solve the above problems, the typewriter according to an exemplary embodiment of the present invention makes a part index map 320 formed of part words that are an accumulated set of texts forming complete words, thereby prevents the generation of unnecessary words by previously removing part words that cannot form proper words in a dictionary with any combinations thereof.

The part words 330 passing through the part index map 320 are filtered once more through the dictionary 340. At this time, words 360 matching situations can be searched using context information 350 that is formed of a set of words in a specific category. The context information 350 can serve to search necessary words in a specific word group corresponding, for example, to an elementary school level, or engineering field, etc.

Through this process, the words to be input through the mediated interface device can be searched among the finally searched results.

Figure 2:
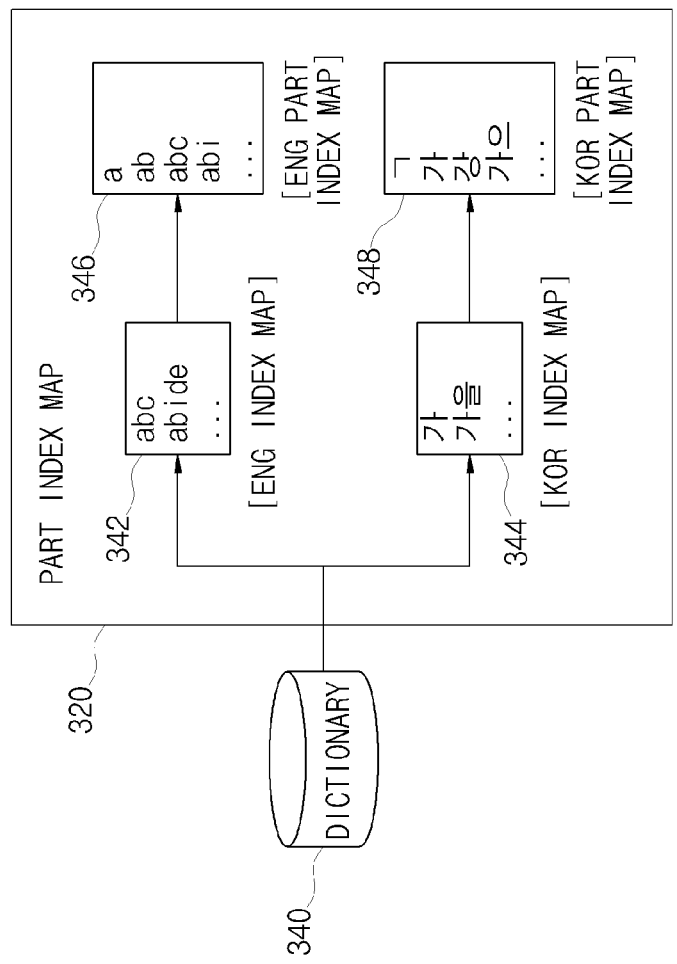
FIG. 2 is a diagram showing a process of generating part index maps used in the typewriter system according to the exemplary embodiment of the present invention.

FIG. 2 shows a process of generating the part index map 320 in more detail.

As shown in FIG. 2, an English index map 342 and a Korean index map 344 are made from the dictionary 340. The English index map 342 and the Korean index map 344 have complete English and Korean words. Next, an English part index map 346 and a Korean part index map 348 extract each word from the English index map 342 and the Korean index map 344 and are made using the accumulated set of texts forming each word. For example, when there is word "abc", part words are "a", "ab", and "abc". When the part index maps 346 and 348 are generated, the word maker 310 can exclude the part words that cannot form a dictionary word in advance by comparing the words with the part words each time the words are generated. Without the part index maps, unnecessary words waste memory and cause delay.

Table 1 represents results obtained by comparing the case where words are searched using a simple word combination and the case where words are searched using the part index map.

TABLE 1

| Example | Word combination form | Number of combined words (number) | Word combination time (ms) | Number of matched words (number) | Dictionary search time (ms) | Consumed time (ms) |
|---|---|---|---|---|---|---|
| [English] circumstance | Simple word combination | 531441 | 516 | 1 | 955 | 1471 |
| | Part index map | 1 | 5 | 1 | 5 | 10 |
| [Korean] 원숭이 | Simple word combination | 19683 | 2239 | 1 | 35 | 2274 |
| | Part index map | 1 | 21 | 1 | 5 | 26 |

Table 1 shows results obtained by comparing the number of combined words and the consumed time when the simple word combination and the part index maps for English word "circumstance" and Korean word '원숭이' are used. The English word 'circumstance' is formed of 12 texts. If each text has 3 recognition text sets, the number of words generated when the simple word combination is performed becomes $3^{12}=531,441$ and when an average length of each word is 8, required memory becomes $3^{12}*8*1$ byte≈33 Mbytes. The time required for dictionary search of 531,441 part words is 955 ms, and the total entire time required becomes 1471 ms. This is 140 times more than that (10 ms) consumed when the part index map is used, and the memory consumption is increased incommensurably.

Figure 3:
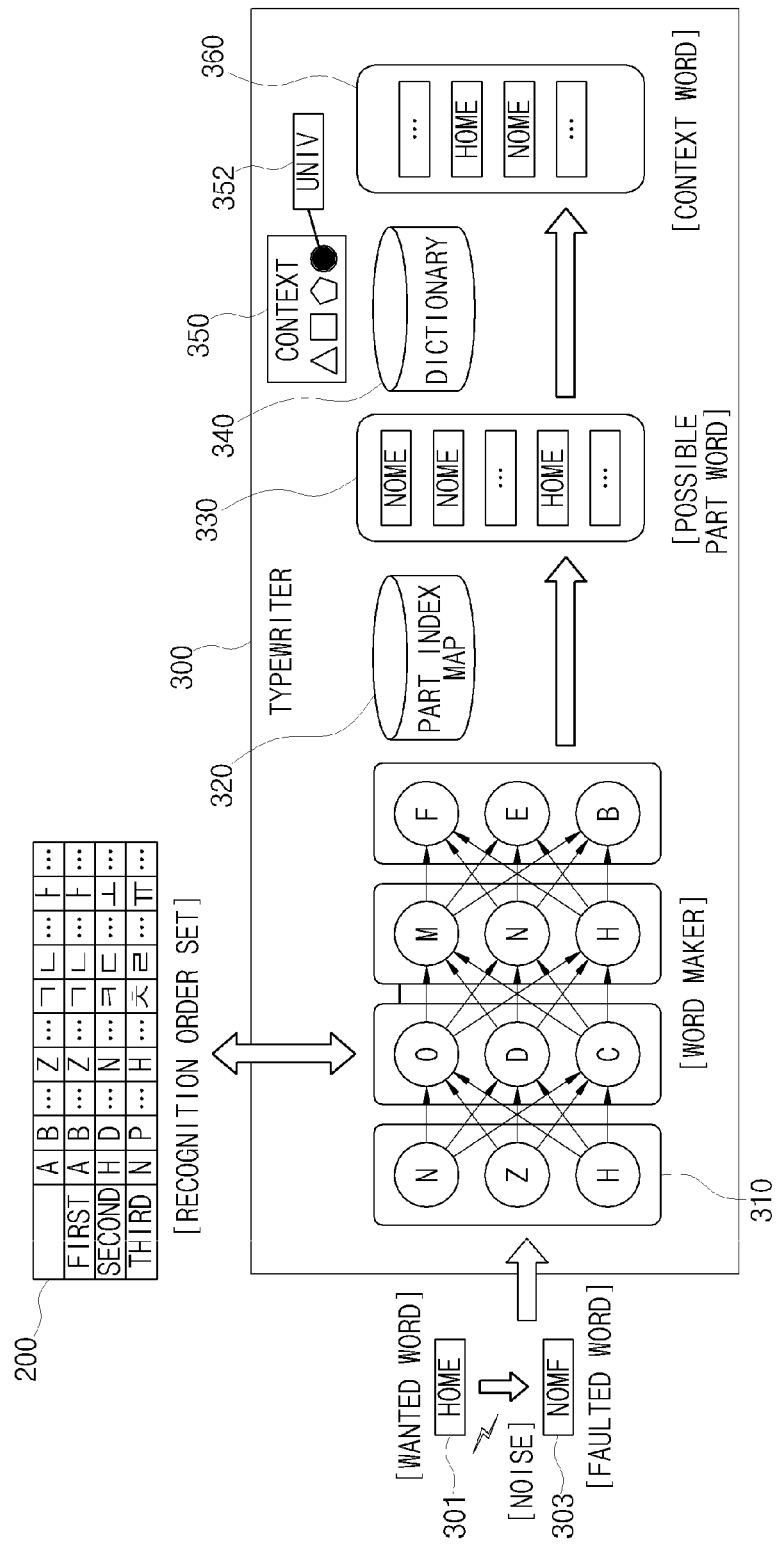
FIG. 3 is a diagram showing an example of inputting texts using the typewriter system according to the exemplary embodiment of the present invention.

FIG. 3 shows a text input method using the mediated interface device according to the exemplary embodiment of the present invention.

As shown in FIG. 3, an original word 301 "HOME" to be input through the mediated interface device 100 becomes the wrongly recognized word 303 "NOMF" due to the errors.

The word combination 310 is first performed based on the text recognition order set 200, and the part words 330, which are candidates of the dictionary words, are selected using the part index map 320. Then, the part words are filtered using the dictionary 340 and the context information 350 such that words 360 matching the context can be finally searched.

The context information 350 may be divided into various categories. For example, words can be filtered using the context information 352 representing words corresponding to a college student level.

The text input method using the mediated interface device according to the exemplary embodiment of the present invention can be implemented as computer readable codes in a recording medium readable by a computer. The computer-readable recording media includes all types of recording apparatuses in which data readable by a computer system is stored. Examples of the computer-readable recording media include a ROM, a RAM, a CD-ROM, a magnetic tape, a floppy disk, an optical data storage, etc., and in addition, include a recording medium implemented in the form of a carrier wave (for example, transmission through the Internet). The computer-readable recording media are distributed on computer systems connected through the network, and thus the computer-readable recording media may be stored and executed as the computer-readable code by a distribution scheme.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A typewriter system, comprising:
    a mediated interface device;
    a text recognition order set that arranges recognition results of texts input through the mediated interface device according to a recognition order; and
    a typewriter comprising:
        a word maker that combines the text inputted through the mediated interface device to form combined words by referencing the text recognition order set, and
        a part index map formed of part words that are an accumulated set of texts forming complete words,
    wherein the combined words are selected by comparing the combined words with the part index map, and
    wherein the text recognition order set is dynamically formed by configuring recognition results for the text input according to the recognition order, and corrects the combined texts using a dictionary.

2. The typewriter system according to claim 1, wherein the part index map includes a Korean part index map and an English part index map.

3. The typewriter system according to claim 1, wherein the typewriter further includes a context information storage unit that is formed of a set of words in a specific category.

4. The typewriter system according to claim 1, wherein the intermediated interface device, the text recognition order set, and the typewriter are formed in one body.

5. The typewriter system according to claim 1, wherein the text recognition order set and the typewriter are configured as a separate device from the mediated interface device and communicates with the mediated interface device in a wireless communication manner.

6. A text input method using a mediated interface device, comprising:
    receiving texts through the mediated interface device;
    combining one or more words corresponding to the input texts, based on a text recognition order set that arranges recognition results of texts input through the mediated interface device according to a recognition order, wherein the text recognition order set is dynamically formed by configuring recognition results for the text input according to a recognition order; and
    selecting one of one or more combined words based on a dictionary,
    wherein the selecting includes selecting one or more words included in a part index map, the part index map being formed of part words that are an accumulated set of texts forming complete words, by comparing the combined words with the part index map.

7. The text input method using a mediated interface device according to claim 6, wherein the part index map includes a Korean part index map and an English part index map.

8. The text input method using a mediated interface device according to claim 6, wherein the selecting references a context information storage unit that is formed of a set of words in a specific category.

\* \* \* \* \*